US012580121B2

(12) United States Patent
Ohodnicki et al.

(10) Patent No.: US 12,580,121 B2
(45) Date of Patent: Mar. 17, 2026

(54) INDUCTOR FOR LOW AND MEDIUM VOLTAGE APPLICATION

(71) Applicant: CorePower Magnetics, Inc., Pittsburgh, PA (US)

(72) Inventors: Paul Ohodnicki, Allison Park, PA (US); Kevin Byerly, Pittsburgh, PA (US); Richard Byron Beddingfield, Cary, NC (US); Mark Nations, Raleigh, NC (US)

(73) Assignee: CorePower Magnetics, Inc., Pittsburgh, PA (US)

(*) Notice: Subject to any disclaimer, the term of this patent is extended or adjusted under 35 U.S.C. 154(b) by 0 days.

(21) Appl. No.: 18/353,835

(22) Filed: Jul. 17, 2023

(65) Prior Publication Data

US 2024/0029946 A1 Jan. 25, 2024

Related U.S. Application Data

(60) Provisional application No. 63/368,835, filed on Jul. 19, 2022.

(51) Int. Cl.
*H01F 27/32* (2006.01)
*H01F 27/24* (2006.01)
*H01F 27/34* (2006.01)

(52) U.S. Cl.
CPC ............. *H01F 27/34* (2013.01); *H01F 27/24* (2013.01); *H01F 27/325* (2013.01)

(58) Field of Classification Search
CPC ........ H01F 27/34; H01F 27/24; H01F 27/325; H01F 3/04; H01F 3/02; H01F 3/08; H01F 3/10; H01F 2003/106; H01F 17/06; H01F 17/062; H01F 27/025; H01F 27/08; H01F 27/22; H01F 27/25; H01F 37/324; H01F 27/26; H01F 27/266
See application file for complete search history.

(56) References Cited

U.S. PATENT DOCUMENTS 2,731,607 A * 1/1956 Gould ..................... H01F 27/22
174/DIG. 2
2,907,968 A * 10/1959 Thurk ..................... H01F 30/16
336/229
4,646,803 A * 3/1987 Hanaoka ............... H01F 27/324
336/219
5,717,373 A * 2/1998 Vachris ................. H01F 27/324
336/219

(Continued)

OTHER PUBLICATIONS

International Search Report and Written Opinion dated Dec. 12, 2023, for PCT/US23/70354, 14 pages.

(Continued)

*Primary Examiner* — Mang Tin Bik Lian
(74) *Attorney, Agent, or Firm* — Fox Rothschild LLP

(57) ABSTRACT

This disclosure provides a gapless medium voltage inductor. The inductor includes a magnetic core having an aperture extending therethrough, a bobbin comprising a first plate and a second plate, a spacer disposed within the aperture of the magnetic core, a longitudinal channel defined through the spacer, first plate, and second plate, and a coil extending through the longitudinal channel and wrapping around the core and the bobbin. The core is disposed between the first and second plates.

25 Claims, 7 Drawing Sheets

(56) References Cited

U.S. PATENT DOCUMENTS

| | | | | |
|---|---|---|---|---|
| 6,262,651 | B1 * | 7/2001 | Miyamoto | H01F 27/29 336/198 |
| 7,471,181 | B1 | 12/2008 | MacLennan | |
| 7,855,629 | B2 | 12/2010 | MacLennan | |
| 7,973,628 | B1 | 7/2011 | MacLennan | |
| 7,973,632 | B2 | 7/2011 | MacLennan et al. | |
| 7,990,244 | B2 | 8/2011 | Huss et al. | |
| 8,009,008 | B2 | 8/2011 | MacLennan | |
| 8,089,333 | B2 | 1/2012 | MacLennan | |
| 8,125,777 | B1 | 2/2012 | MacLennan et al. | |
| 8,130,069 | B1 | 3/2012 | MacLennan | |
| 8,169,290 | B2 | 5/2012 | MacLennan | |
| 8,203,411 | B2 | 6/2012 | MacLennan | |
| 8,373,530 | B2 | 2/2013 | MacLennan | |
| 8,416,052 | B2 | 4/2013 | MacLennan | |
| 8,519,813 | B2 | 8/2013 | MacLennan | |
| 8,624,696 | B2 | 1/2014 | MacLennan | |
| 8,624,702 | B2 | 1/2014 | MacLennan et al. | |
| 8,766,756 | B2 | 7/2014 | Hester et al. | |
| 8,816,808 | B2 | 8/2014 | MacLennan et al. | |
| 8,830,021 | B2 | 9/2014 | MacLennan | |
| 8,902,034 | B2 | 12/2014 | MacLennan | |
| 8,902,035 | B2 | 12/2014 | MacLennan | |
| 8,947,187 | B2 | 2/2015 | MacLennan | |
| 9,196,416 | B2 | 11/2015 | White | |
| 9,257,895 | B2 | 2/2016 | MacLennan | |
| 9,300,197 | B2 | 3/2016 | MacLennan | |
| 9,553,499 | B2 | 1/2017 | Handy et al. | |
| 9,590,486 | B2 | 3/2017 | MacLennan | |
| 10,110,114 | B2 | 10/2018 | MacLennan | |
| 10,211,800 | B2 | 2/2019 | Wennerstrom et al. | |
| 10,312,018 | B2 | 6/2019 | Handy et al. | |
| 10,535,462 | B2 | 1/2020 | Wennerstrom et al. | |
| 10,541,081 | B2 | 1/2020 | Handy et al. | |
| 10,594,206 | B2 | 3/2020 | Wennerstrom et al. | |
| 2006/0125586 | A1 * | 6/2006 | Lee | H01F 3/10 336/83 |
| 2012/0286916 | A1 | 11/2012 | Liu et al. | |
| 2013/0113589 | A1 * | 5/2013 | Luckey | H01F 27/06 336/68 |
| 2013/0278369 | A1 | 10/2013 | Shepard et al. | |
| 2014/0191834 | A1 | 7/2014 | MacLennan | |
| 2014/0338793 | A1 * | 11/2014 | Leary | H01F 41/0226 148/108 |
| 2014/0375410 | A1 | 12/2014 | Yen et al. | |
| 2015/0035467 | A1 | 2/2015 | MacLennan | |
| 2015/0070124 | A1 * | 3/2015 | Kapoor | H01F 3/08 336/211 |
| 2015/0228401 | A1 * | 8/2015 | Ratz | H01F 27/2895 336/198 |
| 2016/0294274 | A1 | 10/2016 | Wennerstrom et al. | |
| 2019/0019613 | A1 * | 1/2019 | Navarro Pérez | H01F 27/29 |
| 2020/0027648 | A1 | 1/2020 | Wennerstrom et al. | |
| 2020/0350109 | A1 * | 11/2020 | Dubois | H01F 27/28 |
| 2021/0343472 | A1 * | 11/2021 | Moon | G01S 7/4817 |
| 2022/0223328 | A1 * | 7/2022 | Vornkahl | H01F 17/062 |
| 2023/0035258 | A1 * | 2/2023 | Inoguchi | H01F 1/15366 |

OTHER PUBLICATIONS https://www.ecraftsmen.com/dc-inductors-chokes-ac-reactors, accessed Jul. 17, 2023.

https://www.schaffner.com/product/sine-wave-filter-fn5020, accessed 0/17/2023.

https://exxelia.com/en/product/detail/552/indirect-cooling, accessed Jul. 17, 2023.

* cited by examiner

INDUCTOR FOR LOW AND MEDIUM VOLTAGE APPLICATION

CROSS-REFERENCE TO RELATED APPLICATION

This application claims priority to U.S. Provisional Patent Application No. 63/368,835, filed Jul. 19, 2022, the disclosure of which is incorporated into this document by reference.

BACKGROUND

This disclosure relates to the field of inductors, and particularly gapless inductors. Many inductors are not adjustable and are hard to manufacture, cool, and service because of their construction. They can require a size that is large and inconvenient in view of the amount of inductance they can provide. The manufacturing technique utilized is difficult to automate and may result in quality defects of the core and inductor construction. The resulting inductors can be unable to operate at medium voltage levels without unacceptable risk or even failure.

This patent document describes a device that addresses at least some of the issues described above and/or other issues.

SUMMARY

In a first aspect, this document discloses a gapless medium voltage inductor including a magnetic core having an aperture extending therethrough, a bobbin comprising a first plate and a second plate, a spacer disposed within the aperture of the magnetic core, a longitudinal channel defined through the spacer, first plate, and second plate, and a coil extending through the longitudinal channel and wrapping around the core and the bobbin.

In some embodiments, the core includes a stack of a plurality of discs each having a central aperture therethrough. The central apertures together can define the aperture through the core. The core can have a relative permeability of 5 to 5000. In some embodiments, the inductor can be configured to suppress common mode noise, and the core can have a relative permeability of 5 to 5000.

In some embodiments, the first and second plates each have an outer dimension larger than an outer dimension of the core. The first and second plates combined may extend along less than 50 percent of a longitudinal length of an outer surface of the core. The first and second plates can be configured to create a gap between the coil and an outer edge of the core. The core can be disposed between the first and second plates. The first spacer and at least one of the first plate or second plate can be formed together as a single piece. The first spacer can electrically isolate the coil from the interior of the core. The first spacer can further include at least one angled edge configured to influence a wrap angle of the coil. The angled edge can include a chamfer or a fillet.

In some embodiments, at least one of the first plate or second plate includes at least one angled edge configured to influence a wrap angle of the coil. The angled edge can be located along an interior surface that partially defines the longitudinal channel and an outer surface facing away from the core. Additionally, or alternatively, the angled edge can be located along an outer surface parallel to the longitudinal channel and an outer surface facing away from the core.

The inductor can further include a second spacer. The first and second spacers can be disposed between the first and second plates and at least partially within the aperture of the core. The spacer, first plate, second plate, and core can each be symmetric about the longitudinal channel. The channel can extend through a least a portion of the core, can be open on two sides, and can be electrically isolated from the core. In some embodiments, the first and second plates can further include at least one protrusion having an aperture configured to receive the fastener.

In some embodiments, the core can be toroidal. In other embodiments, the core can be a racetrack shape. The core can include strip wound into a core. The core can include at least one of: a cobalt-based nanocrystalline alloy material, a nickel-based nanocrystalline alloy material, an iron-based nanocrystalline alloy material, or an amorphous magnetic material. The core can be constructed to have a particular magnetic permeability value. The particular magnetic permeability value can be based on a desired use of the inductor. The core can have a variable permeability through its volume. The core can have at least two regions having different permeability. A first region can have a relatively lower permeability than a second region. The first region can be a lower permeability region on an outer area of the core and the second region is a relatively higher permeability region on an inner area of the core. A permeability of the first region can be configured to provide short circuit current protection to the inductor.

In another aspect, this document discloses an electrical device including an inductor. The inductor can include a magnetic core, a bobbin comprising a first plate and a second plate, a coil wrapping around the core and the bobbin. The electrical device can further include a housing and a fastener extending through the first plate, second plate, and at least one side of the housing.

In some embodiments, the core can be fixed to the housing by the fastener. The housing can at least partially enclose the core, bobbin, and coil. The housing can include an aperture defining an opening through the inductor. The fastener can be made of a dielectric material. The housing can include a plurality of panels. The plurality of panels can be held together by the fastener. In some embodiments, the inductor can be non-potted. In other embodiments, the inductor can be potted.

In another aspect, this document discloses a method of constructing an electrical device. The method can include providing a magnetic core, a bobbin, and a wire, placing the magnetic core within the bobbin, wrapping the wire in a coil around the bobbin and the magnetic core, placing a housing around the wrapped core and bobbin, and securing the housing with a fastener extending through the housing and the bobbin. Providing a magnetic core can include obtaining a nanocomposite magnetic material and tuning the permeability of the material to a particular level. The tuning can include adjusting at least one of an annealing parameter or a material composition of the magnetic core.

DETAILED DESCRIPTION

Figure 1:
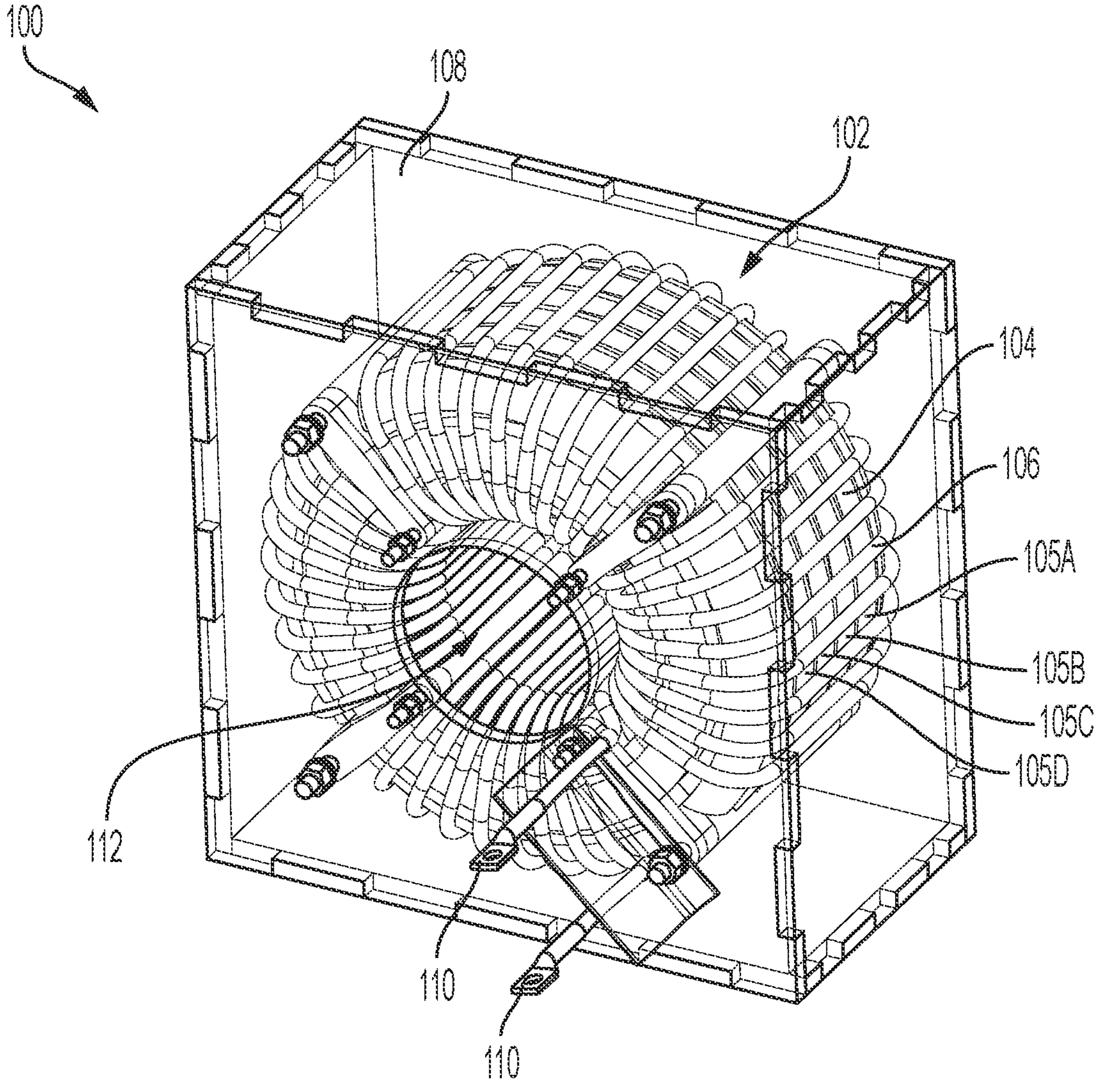
FIG. 1 is a perspective view of an example electrical device.

As used in this document, the singular forms “a,” “an,” and “the” include plural references unless the context clearly dictates otherwise. Unless defined otherwise, all technical and scientific terms used herein have the same meanings as commonly understood by one of ordinary skill in the art. As used in this document, the term “comprising” (or “comprises”) means “including (or includes), but not limited to.” When used in this document, the term “exemplary” is intended to mean “by way of example” and is not intended to indicate that a particular exemplary item is preferred or required.

In this document, when terms such “first” and “second” are used to modify a noun, such use is simply intended to distinguish one item from another, and is not intended to require a sequential order unless specifically stated. The term “approximately,” when used in connection with a numeric value, is intended to include values that are close to, but not exactly, the number. For example, in some embodiments, the term “approximately” may include values that are within +/−10 percent of the value.

In this document, the term “connected”, when referring to two physical structures, means that the two physical structures touch each other. Devices that are connected may be secured to each other, or they may simply touch each other and not be secured.

When used in this document, terms such as “top” and “bottom,” “upper” and “lower”, or “front” and “rear,” are not intended to have absolute orientations but are instead intended to describe relative positions of various components with respect to each other. For example, a first component may be an “upper” component and a second component may be a “lower” component when a device of which the components are a part is oriented in a first direction. The relative orientations of the components may be reversed, or the components may be on the same plane, if the orientation of the structure that contains the components is changed. The claims are intended to include all orientations of a device containing such components.

This disclosure is not limited to the particular systems, methodologies or protocols described, as these may vary. The terminology used in this description is for the purpose of describing the particular versions or embodiments only, and is not intended to limit the scope.

In various embodiments, various designs of inductors are provided. The inductors can have a removeable housing and a gapless core. The core may be made of known materials having a particular tunable permeability (i.e., permeabilities that are selected to achieve a desired relationship between inductance and current). Examples are described in greater detail below.

While each of the figures described in detail below illustrate a gapless inductor, the techniques and devices described herein could be incorporated into a gapped inductor.

A common mode inductor, also known as a common mode choke or filter, is an electronic component that is designed to suppress common mode noise, which is the interference that affects both lines in a signal-carrying pair equally. Gapping in common mode inductors is a technique used to tailor the inductance and adjust the performance of the component by introducing a gap between the magnetic core pieces. The gap can be an air gap or filled with a non-magnetic material.

Deviations in the gap size can lead to variations in inductance and consequently affect the overall performance of the inductor. For common mode applications, desired core permeability (expressed as a ratio relative to the permeability of free space) is between 100-5000. Because of the potential for high desired permeability, in many cases, the desired gap is relatively small compared to other inductor variants, introducing the potential for large variability to manufacturing tolerances. Accordingly, gap control and elimination of the gap can be beneficial in common mode applications. In various applications, the core permeability can be between 5-5000.

FIG. 1 illustrates an example electrical device 100 with an inductor 102 inside a housing (or enclosure) 108. For illustration purposes, housing 108 is depicted in FIG. 1 as being transparent. The inductor 102 can include a magnetic core 104 and wire or coil 106. The coil 106 can be wrapped around the core. The ends of coil 106 may form leads 110 that extend through housing 108. Housing 108 can include an aperture 112. Aperture 112 can serve as an air-cooling vent into a channel running through the inductor or an area for receiving a water-cooling unit, as described in greater detail below. In some embodiments, inductor 102 can be configured to suppress common mode noise. In other words, inductor 102 can be a common mode inductor.

Core 104 is a tape wound inductor core formed from thin strips of material (e.g., from tens of microns up to about two-thousandths of an inch thick). The strips can be wound into a core 104 or a portion of a core (e.g., a disc 105A-D). In some embodiments, core 104 could be formed into stamped and stacked core. The material can be a magnetic material that is an iron-based or other nanocrystalline alloy including one or more of: Cobalt (Co), an iron-nickel alloy, or an iron-cobalt alloy. Accordingly, the core can comprise a cobalt-based, nickel-based, or iron-based nanocrystalline alloy material. Other elements such as boron, carbon, phosphorous, silicon, chromium, tantalum, niobium, vanadium, copper, aluminum, molybdenum, manganese, tungsten, and zirconium may also be included in the core 104. In some embodiments, core 104 could be constructed of an amorphous magnetic material. In additional embodiments, core 104 could be constructed of a nanocrystalline material. Core 104 can be constructed of a material such that its magnetic permeability may be controlled and tuned to a specific value or within a specific range of values during construction. For example, known techniques of producing materials of specific permeabilities such as strain or field annealing can be employed to produce the material for core 104. A core having a specific magnetic permeability (i.e., a specific ratio of magnetic induction to the magnetic intensity) can be produced by controlling the composition of the material, as well as the annealing parameters, to produce a particular material structure having the desired permeability. These materials can be nanocomposites made of one or more of the elements listed above. Permeability adjustment facilitates tuneability of inductance values of the inductor, which permits construction application specific inductors. The use of multiple concentric core discs can permit discs having different permeabilities to be used in the same core to achieve a desired permeability profile for the core. The use of a single or multiple continuous strip ribbon with varying permeability along the length of the ribbon can also be utilized for achieving a desired permeability profile for the core.

Core 104 can be created by processing the amorphous or nanocrystalline magnetic strip (which may also be referred to as a "tape" or "ribbon") and winding it into the desired shape. To form the material into the desired shape, the material can be rapidly solidified and then thermally processed (i.e., heated) in the presence of applied tensile or magnetic fields and wound onto a mandrel to form a tape wound toroidal core. The temperature, magnetic field, tensile stress, and speed of translation of the ribbon through the process can all be controlled to influence the permeability of the resulting core. In some cases, post-winding processing may also be used, such as transverse or longitudinal field annealing. In some embodiments, core discs having different distinct permeability variations can be formed and then stacked together to achieve a desired permeability profile in the overall core formed by the stacked discs. Accordingly, core 104 can have a variable permeability profile through its volume. For example, core 104 could have at least two regions having different permeabilities. The first region can be a lower permeability region on an outer area of the core, and a second region can be a relatively higher permeability region on an inner area of the core. In other embodiments, the higher permeability region may be on the outside of the core, and a lower permeability region can be an inner area of the core. As a specific example, FIG. 4. illustrates line 103 separating a first region 107A and a second region 107B. As illustrated, the first region 107A is an outer area of core 104 and second region 107B is an inner area of the core. Accordingly, region 107A can be a lower permeability region and region 107B can be a higher permeability region, or vice-versa. In some embodiments, single or multiple strip ribbon segments of varying permeability along the length of the ribbon can be utilized to achieve a desired permeability profile in the overall core formed by the wound ribbon.

Core 104 has an aperture extending through it and is of a substantially toroidal shape. In some embodiments, core 104 can take other shapes such as a racetrack, rectangular shape, an oval-shaped or circular cylinder, a cube, or others. Core 104 can be formed from a combination of component parts. For example, as shown in FIG. 1, core 104 can be a stack of a plurality of discs 105A-D. Discs 105A-D each have an aperture. The aperture of the discs 105A-D is a central aperture through the middle of the discs such that the apertures can be aligned to form the aperture through the whole core 104. As another example, core 104 can be constructed by a single or wound ribbon in a tape wound core form, where the ribbon may have uniform or alternatively a spatially varying permeability along the length of the ribbon.

By making the core out of individual discs 105A-D, the inductance of the core can be changed by adding or removing discs 105A-D. For example, although four discs 105A-D are depicted, an inductor could be constructed with 3, 5, or any other number of discs. Alternatively, the core 104 can be made of a single or multiple strips of ribbon with uniform or spatially varying permeability. The inductance of the core can then be changed by modifying the permeability of the strips, the length of the strips, and/or the number of strips that comprise the core as well as the geometrical shape of the core.

The disclosed embodiments can provide improved short circuit current protection as compared to conventional inductors. Such short circuit current protection can be achieved by using a core having a lower permeability region on the outer diameter of the core. The lower permeability region is a region of the core, positioned on the outer diameter of the core that has a relatively lower permeability than the other region or regions of the core. For example, core 104 could have at least two regions having different permeabilities. The first region can be a relatively lower permeability region on an outer area of the core and a second region is a relatively higher permeability region on an inner area of the core. The lower permeability region can be configured to provide short circuit current protection by providing unused flux capacity to account for current spikes, including short circuit conditions. In some embodiments, more complex permeability profiles may be utilized to achieve a desired flux linkage versus winding current relationship for short circuit current handling characteristics. In other embodiments, the permeability profile and saturation levels can be utilized to provide a staged inductance for "soft saturation." Soft saturation occurs when the inductance of the inductor slowly decreases with increased current running through the inductor. Conversely, an inductor that does not exhibit soft saturation (i.e., hard saturation) will have an inductance that drops precipitously at a certain current level.

In some embodiments, the lower permeability region has a specific permeability selected to still contribute to rated current operation while accounting for short circuit current levels. The remainder of the core can also be structured with various regions having permeability or permeabilities selected to optimize flux concentration through the inductor volume. The short circuit protection could be applied to inductors having constructions other than those specifically described here. For example, inductors having other core shapes, gapped inductors, etc. could be constructed to have varying permeabilities to optimize flux concentration for tailoring saturation.

In one example, the inductor can be a common mode inductor configured to filter common mode noise. In this example, the relative permeability (i.e., the ratio of the permeability of free space to the permeability of the inductor core) of the core may be between 100 and 5000.

The coil 106 can be magnet wire or other suitable uninsulated wire types. The wire can be various sizes, for example, wire with a diameter ranging from 40 awg to 4/0 awg. In some embodiments, the wire may be multi-filar wire including a combination of wires of the same size or different sizes. In such multi-strand wire, the individual filaments of the wire may not be insulated from one another, but the whole bundle of filaments may be insulated. The coil 106 can be wrapped around core 104. Specifically, as shown in FIG. 1, the coil 106 can extend through the aperture of the core and wrap around the core in circular fashion, with each successive wrap going from the outside, through the aperture, and back around the outside. The number of wire wraps can depend on the size of the core, the size of the wire, and the desired inductance to be achieved by the inductor.

Each end of coil 106 can include a connector. The connector can provide an attachment point for other electrical components in the system. Connectors may take a variety of forms including a bare stripped wire, a clamp, a ring terminal, a spade terminal, a fork terminal, a male or female blade connector or quick disconnect, or others. Connectors may, for example, be crimped, soldered, or both soldered and crimped to the end of the coil 106.

Figure 2:
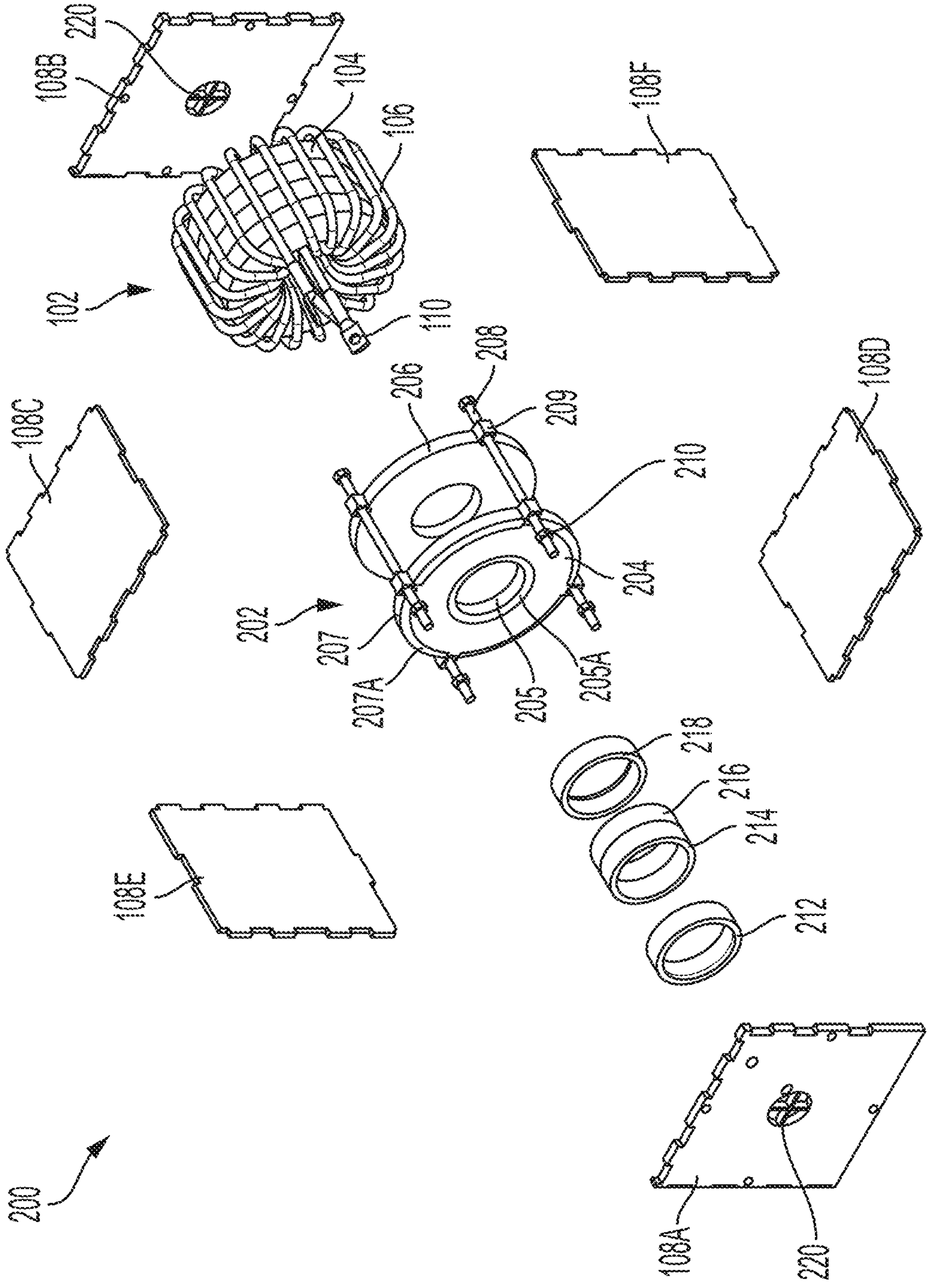
FIG. 2 is an exploded perspective view of an example electrical device.

FIG. 2 is an exploded perspective view the of an example electrical device 200. Electrical device 200 can include a housing substantially similar to housing 108 of FIG. 1 made up of plurality of panels 108A-F. Front panel 108A and back panel 108B include apertures 220. Apertures 220 can be openings through panels 108A, 108B for air cooling of the inductor 102. Aperture 220 can define an opening through the housing that aligns with an opening through the inductor 102. Accordingly, the aperture 220 and the opening through inductor 102 can form a longitudinal channel that extends through the entire housing inductor, including the bobbin plates 204, 206, and spacers. In some embodiments (as shown in FIG. 2) aperture 220 can include a cross or other shape, separating the aperture into a plurality of smaller apertures. In other embodiments (e.g., aperture 112 of FIG. 1), aperture 220 could be a circular hole. Aperture 220 could also take other open geometric shapes such as a square, rectangle, triangle, oval, pentagon, hexagon, octagon, etc. The size and location of aperture 220 may be adapted based on the size of the core 102 and bobbin 202, including the size of any inner apertures of the core 102 and bobbin 202. For example, aperture 220 can be sized to be approximately the same diameter as apertures through bobbin 202 and core 102. While aperture 220 is illustrated as located at approximately the center of panel 108A, aperture 220 may be located in other areas of panel 108A. For example, if inductor 102 does not include a center channel, aperture 220 could be located relative to an outer edge of inductor 102. By, for example, locating multiple apertures around the outer edge of inductor 102, the outer periphery of the inductor 102 could be cooled.

The housing can further include a top panel 108C, bottom panel 108D, and side panels 108E, 108F. As shown in the figures the panels 108A-F can include dovetails (alternating protrusions and grooves) to mate with adjacent panels to form the housing. The panels can be held together by the dovetails in combination with fasteners and the bobbin clamp. This connection is described in greater detail below. The housing can be made from a dielectric material to improve isolation and insulation. For example, housing materials can include non-metallic materials such as glass reinforced laminates or polymers, etc. In some embodiments, the housing can include separate insulation on the interior.

Inductor 102 can include a core 104 made of a magnetic material wrapped with coil 106, substantially as described above. Coil 106 may also be wrapped around bobbin 202. Bobbin 202 can include a first plate 204 and a second plate 206. Core 104 can be disposed between the first plate 204 and second plate 206. Accordingly, as shown in, for example, FIG. 4, first plate 204 and second plate 206 are disposed at opposite ends of core 104. The use of such a bobbin 202 eliminates the need for an impregnation insert between the core 104 and coil 106 (e.g., when impregnating an inductor with an epoxy to hold the core and coils in place. The spacers, described in greater detail below, can also help provide this advantage. Coil 106 can be wrapped with even spacing around the core and bobbin. In other words, the distances between each wrap of coil 106 around the core and bobbin can be approximately equal. Thus, the wire of coil 106 is uniformly distributed around the core and bobbin. First plate 204 and second plate 206 can be flat and substantially planar. Accordingly, when the inductor is constructed, the first and second plates 204, 206, may each cover an end of the core without extending beyond the ends to cover any of the outer sides of the core. As an example, the plates 204, 206 may each extend along less than 10% of the outer sides of the core (in the longitudinal direction). As another example, the total coverage of the outer sides of the core by combination of the plates 204, 206 can be less than 25 percent or less than 50 percent of the total thickness of the core (in the longitudinal direction). Put differently, the first and second plates combined can extend less than 50 percent of a longitudinal length of an outer surface of the core. The thickness of the first and second plates 204, 206 can vary based on the particular inductor being constructed.

An inside surface 205 and outside surface 207 of first plate 204 and second plate 206 can include an angled edge 205A, 207A, for example a chamfer or fillet, to influence the wrapping of the wire of coil 106 around the bobbin 202. The angled edge 205A can be located along an interior surface (e.g., inside surface 205) that partially defines the longitudinal channel and an outer surface facing away from the core. The angled edge 207A can also be an outer edge between an outside surface 207 of the plate and the outer surface facing away from the core. When wrapped around the bobbin 202, the coil 106 will follow the angle or curve of the angled edge. Accordingly, the angled edge can permit bends of less than ninety degrees in the wire to help ensure wire integrity and longevity. The angled edges can also be sized to provide an optimal bend radius to the coil 106 to help avoid collisions of the wire on the internal diameter of the core 104 (e.g., it helps ensure a smooth wrap all the way around core 104). Additionally, the pitch of the angled surface can be changed based on one or more of: the size of the bobbin 202 (e.g., inner and outer diameters), the thickness of the core 104, the size of coil 106, or the thickness of spacers 212. The outer dimension of the plates 204, 206 can be larger than an outer dimension of the core 104. For example, when the plates 204, 206 are a substantially circular shape, the outer diameter of the plates 204, 206 can be larger than the outer diameter of the core 104. This difference in the outer diameters allows for a gap between the coil 106 and the core 104, isolating the coil 106 from the core 104. Accordingly, the plates 204, 206 can be configured to create a gap between the coil 106 and the outer edge of the core 104. Therefore, the configuration of the plates 204, 206 permits wire guides to be integrated into the assembly process of the inductor. In some embodiments, the inner diameter of the plates 204, 206 could be smaller than an inner diameter of the core 104 to achieve a similar gap between an interior surface of the core and the coil 106. However, in other embodiments, as explained below and shown in the figures, one or more spacers can be placed within the aperture of the core 104 to take up this space and provide isolation between the core 104 and coil 106.

Figure 4:
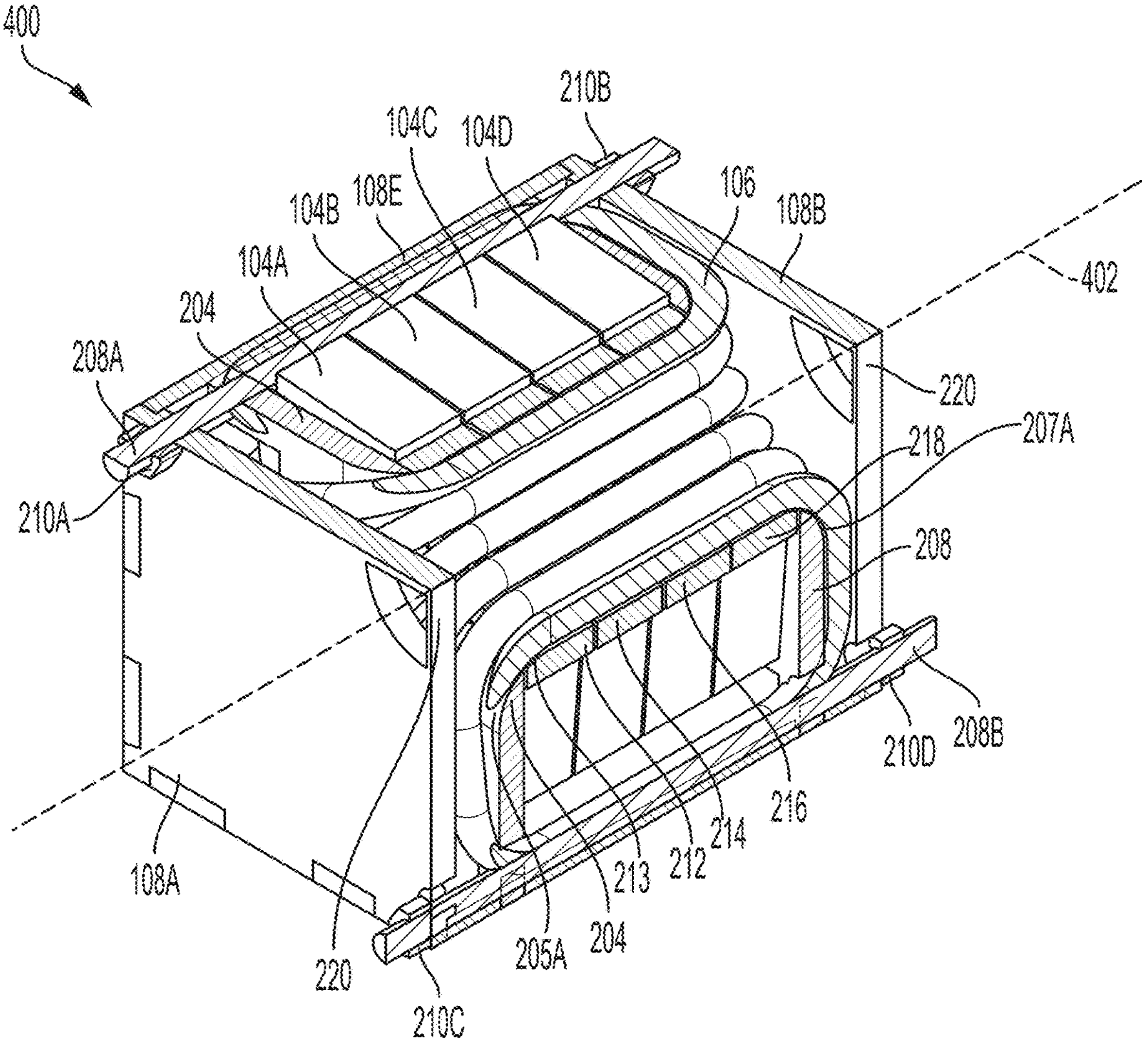
FIG. 4 is a perspective cross-sectional view of the example electrical device of FIG. 2.

Electrical device 200 can include one or more spacers 212-218. While FIGS. 2 and 4 illustrate four spacers 212-218, in some embodiments, more spacers or fewer spacers can be used. For example, spacers 212-218 may be combined into a single spacer. Spacers 212-218 include apertures that align with aperture 220 and the apertures of the bobbin 202 and core 102. Spacers 212-218 can be disposed within the aperture of core 104. Accordingly, spacers 212-218 are a hollow cylindrical shape ("pipe") shape and can be sized to have an outer diameter slightly smaller than the inner diameter of core 104. In other embodiments, for example those where core 104 is not a toroidal core, spacers 212-218 can be sized and shaped accordingly. Coil 106 can extend through the center of spacers 212-218 when it is wrapped around core 104. Accordingly, spacer 212-218 can electrically isolate the coil 106 from the interior of core 104. Similar to plates 204, 206 described above, spacers 212, 218 can include an outer angled edge 213 to influence a wrap angle of the coil 106. Spacers can be constructed of appropriately rated dielectric and/or insulation materials such as fiberglass, polymers, glass, or other ceramics.

The use of the bobbin 202 and spacers together ensures that coil 106 is isolated from core 104, which ensures proper functioning of the inductor. The use of individual spacers 212-218 permits easy addition or removal of core discs to adjust the inductor. Further, the design of bobbin 202 permits it to act as an adjustable clamp to hold the core discs together. The bobbin plates 204, 206 can slide along fasteners 208 to expand and contract as core discs are added or removed. In some embodiments, an additional nut can be placed on the fasteners 208 on the outside of each plate 204, 206, but on the inside of the housing to hold the plates 204, 206 in place with respect to the fasteners. This permits the inductor 102 to be suspended by the fasteners within the housing. The bobbin 202 thus permits an adjustable inductor that is useable with forced air cooling (because of the longitudinal channel through the inductor). The longitudinal channel is always present, even if core discs are added or removed. This suspension can improve the shock resistance and mechanical integrity of the electrical device.

In some embodiments, one of plates 204, 206 and at least one of spacers 212-218 could be formed as a single piece. For example, spacers 212-218 could be a protrusion extending from plate 206. The protrusion can have a center aperture through it and the core 104 could be placed over the protrusion. Plate 204 could then be attached and compressed together with plate 206, as described herein.

The bobbin 202 and spacers 212-218 can be constructed of low electrical conductivity materials such as glass-reinforced laminates including GPO-3 and FR-4. The materials may preferably also be machinable for production of the bobbin plates 204, 206 and spacers 212-218. Because the bobbin and spacers touch both the core 104 and coil 106, the material should have a low electrical conductivity.

Referring to FIG. 4 is a cross-sectional view of an electrical device 400 illustrating the interior construction of the inductor. As shown, spacers 212-218 can be placed within magnetic 104A-104D core 104 having discs 104A-D. The spacers 212-218 and core discs 104A-D can them be sandwiched between bobbin plates 204, 206. Coil 206 can then be wrapped around the bobbin/spacer/core combination. In other embodiments, for example, those that employ strips or another shape of core (rather than discs), the spacers 212-218 can be of another suitable shape. Similarly, the strips (or other shape) can be sandwiched between the bobbin plates 204, 206 and wrapped with coil 206, just as the discs. The coil 106 can be run through the longitudinal channel defined through the spacers 212-218, plates 204, 206. And wrapped around the outside of the plates 204, 206, and back through the longitudinal channel repeatedly. Axis 402 illustrates the center of the longitudinal channel. The channel can extend the entire way through electrical device 400, including apertures 220. As described above, this longitudinal channel can be used for cooling the inductor by, for example, forcing air through the longitudinal channel.

Figure 3:
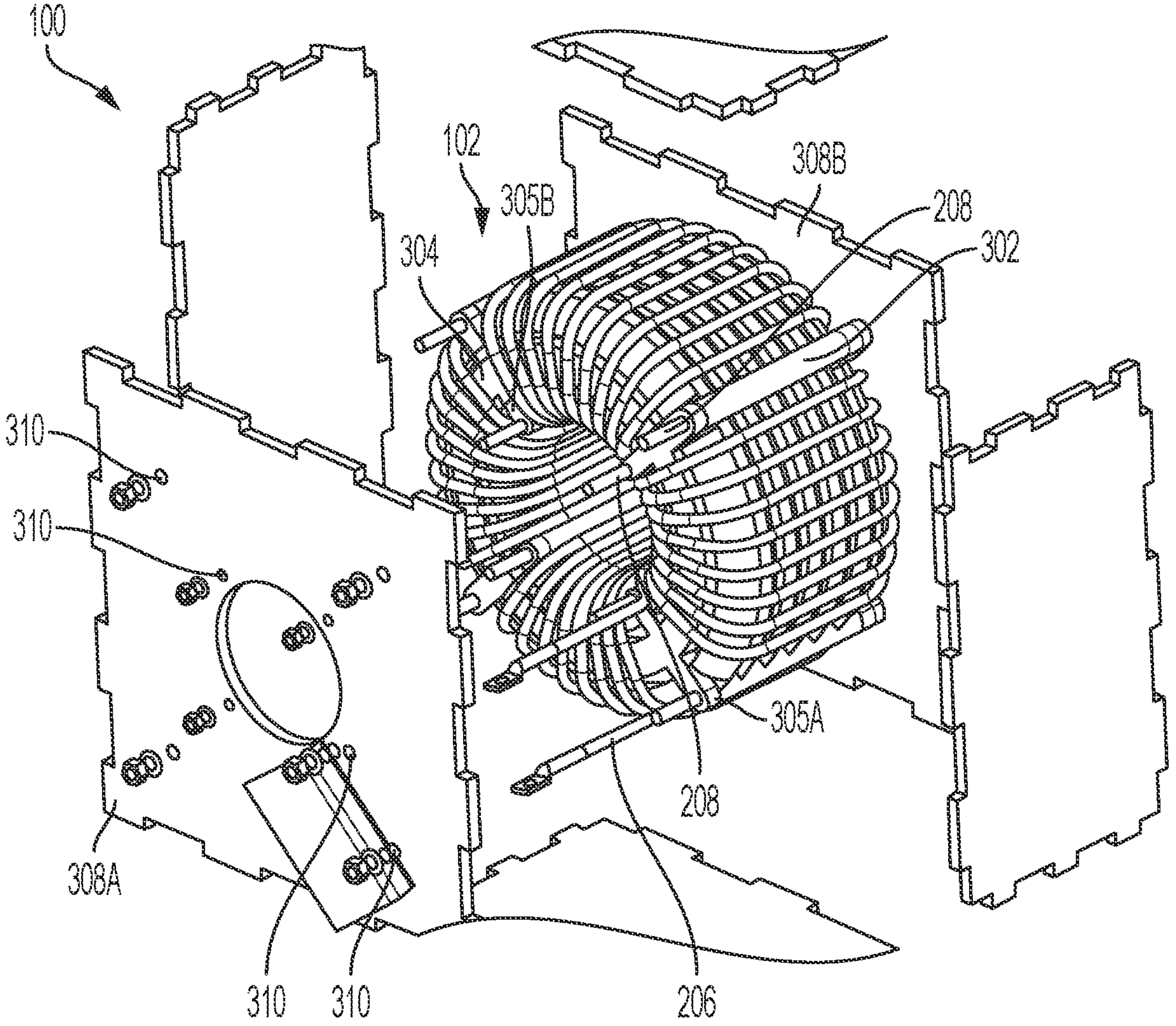
FIG. 3 is an exploded perspective view of the example electrical device of FIG. 1.

Electrical device 200 also includes one or more fasteners 208. Fastener 208 can be a bolt, screw, threaded rod, pin, rivet, or other suitable hardware for securing the inductor 102, bobbin 202, and housing together. The fastener 208 can be constructed from a dielectric material (for example, a fiberglass threaded rod or similar material) to prevent electrical interference between the inductor 102 and the fastener 208. In some embodiments, fastener 208 can be secured by a nut 210. Bobbin 202 is shown in FIG. 2 as having four fasteners generally around its outer periphery. In other embodiments, more or fewer fasteners may be used. As an example, FIGS. 1 and 3 illustrate an inductor having a bobbin with eight fasteners, four around the outer periphery of the core and four near the interior, along the main aperture of the core. The plates 204, 206 can include one or more protrusions 209. Protrusions 209 can have aperture therethrough configured to receive a fastener 208. The aperture through protrusion 209 is substantially parallel to apertures through plates 204, 206 and core 104. Put differently, the aperture through protrusion 209 is perpendicular to the inner and outer planar surfaces of plates 204, 206. This orientation will prevent fastener 208 from interfering with core 104 or coil 106 when the inductor is assembled and installed in the housing.

Figure 5:
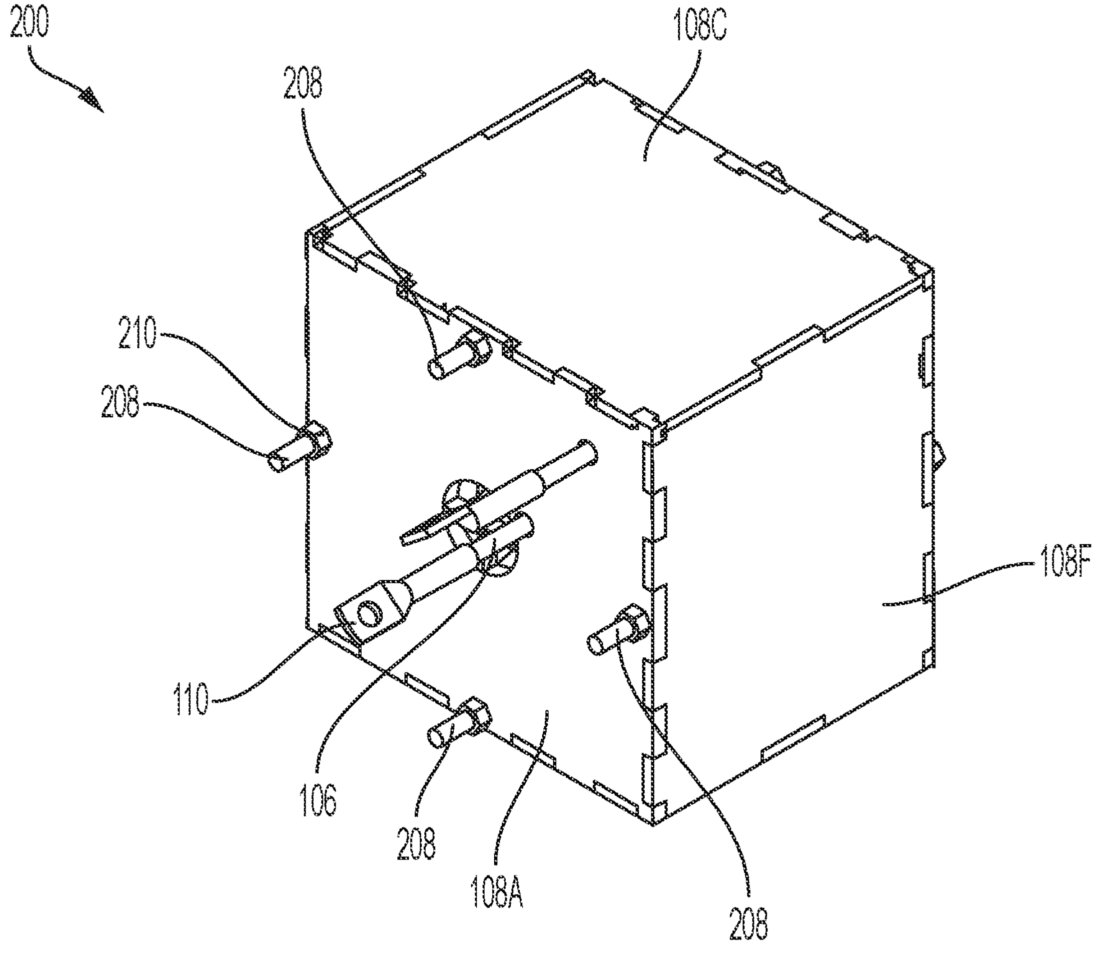
FIG. 5 is a perspective assembled view of the example electrical device of FIG. 2.

Fastener 208 can extend through both bobbin plates 204, 206 and at least one of housing panels 108A or 108B. By extending through both the bobbin 202 and housing 108, fastener 208 can fix the core to the housing, limiting the motion of the core within the housing. This arrangement can improve the mechanical stability of the inductor and increase its resiliency to shock from impacts, drops, or other damage. In some embodiments, the fastener will extend through both housing panels 108A and 108B. Thus, when the fastener is secured, it will compress housing panels 108A and 108B together. This compression can also hold other panels 108C-F together (e.g., via dovetail connections) to form the complete housing. Such an arrangement is visible in FIG. 4, where fasteners 208A and 208B are depicted as threaded rods with a nut on each end. When the nuts are tightened, they compress panels 108A, 108B together, holding the inductor 102 and panel 108E between them. FIG. 5 is an illustration of electrical device 200 in an assembled state in which panels 108A-F are connected and secured through fasteners 208. In some embodiments, fastener 208 may extend from and be integral to one of panels 108A, 108B. For example, fastener 208 could be an integrated pin that protrudes from panel 108B.

FIG. 3 is an exploded view of the example electrical device 100 from FIG. 1. As explained above, the bobbin of electrical device 100 includes eight fasteners 208, located around the inner and outer periphery of bobbin. The bobbin may include a front plate 304 with interior protrusions 305B and exterior protrusions 305A to properly receive each of the fasteners 208. Each protrusion 305A-B can include a hole in through which a fastener 208 can extend. Front panel 308A of the housing 108 of electrical device 100 includes eight corresponding holes 310 to receive one of the fasteners 208. Front panel 308A can also include holes corresponding to ends of wire of coil 106. Coil 106 can extend through the holes in panel 308A in order to permit the inductor to be connected to a circuit or other electrical components.

Some embodiments can include one or more bobbin fastener spacers 302 that fit over the fastener are disposed between plates 204, 206. Bobbin fastener spacers 302 can provide a specific spacing between bobbin plates 204, 206 and ensure that plates 204, 206 maintain this spacing when fastener 208 is tightened. Additional spacers can be placed between bobbin plates 204, 206 and the housing. These additional spacers can isolate the inductor from the housing. Additionally, the spacers can be shock absorbers to absorb vibrations or other movements of the housing. For example, spacers made of a soft or vibration dampening material can be placed between bobbin plates 204, 206 and the housing to limit vibration transfer from the housing to the inductor. This can limit mechanical stresses experienced by the inductor in certain applications. As shown in the figures, the housing can at least partially enclose the inductor 102 having core 104 and coil 106 and bobbin 202. For example, the only exposed surfaces may be those near aperture 220 along the longitudinal channel.

The figures illustrate and the aforementioned embodiments may each be employed in non-potted inductors.

However, in some embodiments, the inductors may be potted. A potted inductor is filled with a potting compound to ensure isolation between the coil and core. However, one advantage provided by disclosed embodiments is that the electrical devices can be taken apart (e.g., by first removing fasteners 208) and disassembling the housing and inductor. This facilitates service and repairs of the inductor. However, when the inductor is potted, the potting compound is not easily removed and can make for difficult, if not impossible, repairs.

Figure 6B:
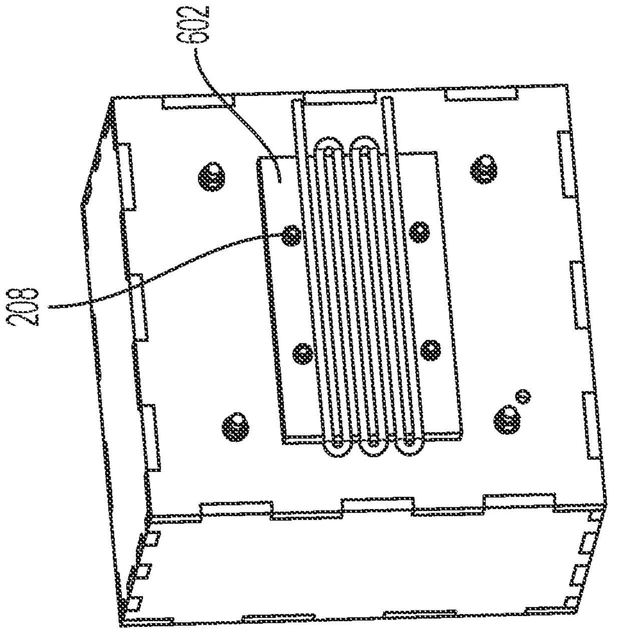
FIG. 6B is a perspective assembled view of an example electrical device with a cooling system.
Figure 6A:
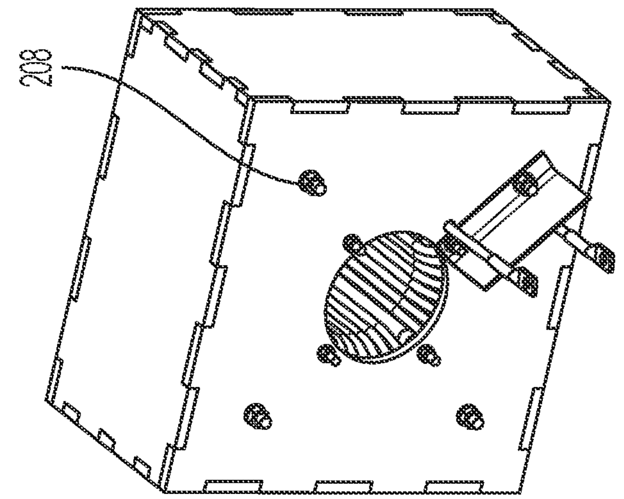
FIG. 6A is a perspective assembled view of an example electrical device.

FIG. 6A illustrates an inductor without a separate cooling system installed and is provided for comparison purposes to FIG. 6B, which illustrates the same inductor with an installed cooling system 602. Cooling system 602 can be a heat exchanger. The heat exchanger can include a water-cooling system with a heat sink disposed inside the longitudinal channel through the inductor housing. Cooling system 602 can be connected to the housing by one or more of fasteners 208. Additionally, or alternatively, other fasteners (e.g., fasteners not used to hold together the housing or running through the bobbin) may be used to connect the cooling system 602 to the electrical device.

Figure 7:
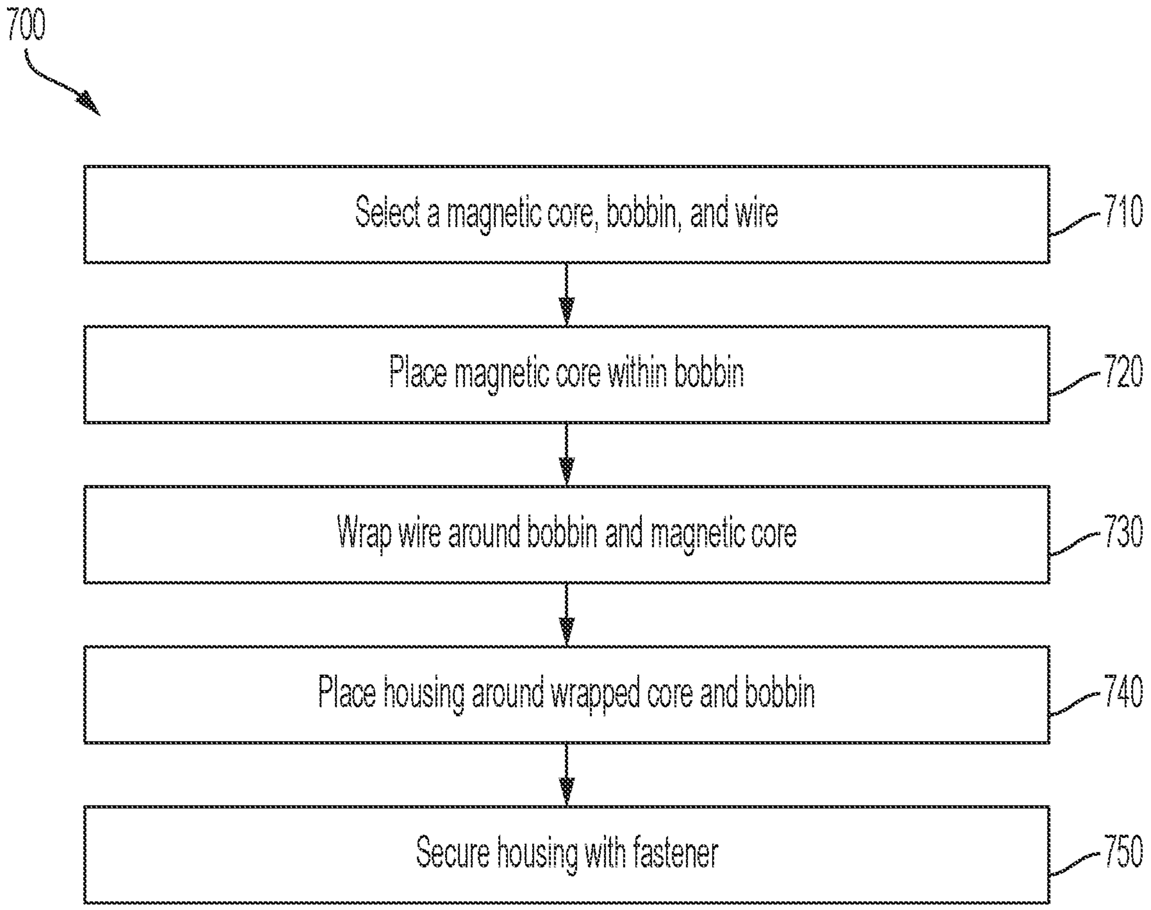
FIG. 7 is a flowchart illustrating an example method of constructing an electrical device.

FIG. 7 is a flowchart illustrating an example method 700 for constructing an electrical device. At step 710, method 700 includes providing a magnetic core, a bobbin, and a wire. The core, bobbin, and wire (coil) can be substantially constructed as described above. At step 720, method 700 can further include placing the magnetic core within the bobbin. For example, the bobbin can include two plates 204, 206 placed around the core. Accordingly, placing the magnetic core within the bobbin can include placing the plates 204, 206 around (e.g., on opposite sides of) the core.

At step 730, method 700 can include wrapping the wire around the bobbin and the magnetic core, for example, through the center aperture of the core and bobbin, as described above. Then, at step 740, method 700 can include placing a housing 108 around the wrapped core and bobbin. At step 750, method 700 can further include securing the housing with a fastener 208 extending through the housing 108 and the bobbin (e.g., at least one of bobbin plates 204, 206). In some embodiments, providing a magnetic core includes obtaining a nanocomposite magnetic material and tuning the permeability of the material to a particular level. The tuning can include adjusting at least one of an annealing parameter or the material composition of the magnetic core.

The embodiments described in this document may be used in either low voltage or medium voltage applications. Except where stated otherwise, in this document the terms “low voltage” and “medium voltage” are intended to include all voltage ranges as may be known in the relevant technical field. For example, “low voltage” systems typically include electrical systems that are rated to handle voltages of 1000 volts (V) or less. “Medium voltage” (MV) systems typically include electrical systems that are rated to handle voltages from about 1000 V to about 38 kilovolts (kV). Some standards define MV as including the voltage range of 600 V to about 69 kV. (See NECA/NEMA 600-2003.) Other standards for medium voltages include ranges that have a lower end of 1 kV, 1.5 kV or 2.4 kV and an upper end of 35 kV, 38 kV, 65 kV or 69 kV. (See, for example, IEC 60038, ANSI/IEEE 1585-200 and IEEE Std. 1623-2004, which define MV as 1 kV-35 kV.) In such standards, the term “low voltage” would include all ranges under such levels.

The various embodiments disclosed in this patent document provide advantages over the prior art, whether standalone or combined. For example, the modular design that is easily disassembled provides the ability to perform maintenance or repairs on the inductor. The modular design also requires fewer unique parts to manufacture inductors of varying inductances and sizes. For example, in some instances, many different strengths of inductor can be created using the same bobbin plates, spacers, fasteners, and housing. More specifically, the number of cores may be varied while using the same bobbin plates, fasteners, and housing. To add or reduce core layers, the number of core spacers and fastener spacers can change to accommodate the added or lessened thickness of the core. Additionally, the non-gapped design permits use of smaller components, as well as provided improved performance through reduced gap losses, proximity losses, and fringing flux, and local thermal hotspots. The cooling channel provided by the longitudinal channel through the inductor facilitates increased cooling and lower running temperatures. Locating the cooling channel at the center of the inductor can improve convective cooling by cooling the warmest part of the inductor (unless otherwise designed)—the outer wires that are more spaced apart will naturally cool faster and thus have less of a need for a dedicated cooling channel. In cases where it is desired to introduce cooling at the outer diameter, the core can be designed to show a peak temperature at the outer surface through optimization by varying permeability, selection of number and properties of strips, or selection of number and properties of discs. Other advantages, such as the angled edges of the bobbin and spacers providing a controlled wire bend radius, are described above.

Other advantages of the present invention can be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described in this document, but is intended to include all changes and modifications that are within the scope and spirit of the invention as defined in the claims.

As described above, this disclosure describes various embodiments of inductors, devices including inductors, and methods for constructing inductors and devices. The embodiments include, without limitation, those described in the following clauses:

Clause 1: A gapless medium voltage inductor comprising a magnetic core having an aperture extending therethrough, a bobbin comprising a first plate and a second plate, a spacer disposed within the aperture of the magnetic core, a longitudinal channel defined through the spacer, first plate, and second plate, and a coil extending through the longitudinal channel and wrapping around the core and the bobbin.

Clause 2: The inductor of clause 1, wherein the core includes a stack of a plurality of discs each having a central aperture therethrough.

Clause 3: The inductor of clause 2, wherein the central apertures together define the aperture through the core.

Clause 4: The inductor of clause 1, wherein the inductor is configured to suppress common mode noise.

Clause 5: The inductor of clause 1, wherein the core has a relative permeability of 100 to 5000.

Clause 6: The inductor of clause 1, wherein first and second plates each have an outer dimension larger than an outer dimension of the core.

Clause 7: The inductor of clause 1, wherein the first and second plates combined extend along less than 50 percent of a longitudinal length of an outer surface of the core.

Clause 8: The inductor of clause 1, wherein the first and second plates are configured to create a gap between the coil and an outer edge of the core.

Clause 9: The inductor of clause 1, wherein the core is disposed between the first and second plates.

Clause 10: The inductor of clause 1, wherein the first spacer and at least one of the first plate or second plate are formed together as a single piece.

Clause 11: The inductor of clause 1, wherein the first spacer electrically isolates the coil from the interior of the core.

Clause 12: The inductor of clause 1, wherein the first spacer further comprises at least one angled edge configured to influence a wrap angle of the coil.

Clause 13: The inductor of clause 12, wherein the angled edge comprises a hchamfer or a fillet.

Clause 14: The inductor of clause 1, wherein at least one of the first plate or second plate includes at least one angled edge configured to influence a wrap angle of the coil.

Clause 15: The inductor of clause 1, wherein the angled edge is located along an interior surface that partially defines the longitudinal channel and an outer surface facing away from the core.

Clause 16: The inductor of clause 1, wherein the angled edge can be located along an outer surface parallel to the longitudinal channel and an outer surface facing away from the core.

Clause 17: The inductor of clause 1, wherein the inductor further comprises a second spacer.

Clause 18: The inductor clause 17, wherein the first and second spacers are disposed between the first and second plates and at least partially within the aperture of the core.

Clause 19: The inductor of clause 1, wherein the spacer, first plate, second plate, and core are each symmetric about the longitudinal channel.

Clause 20: The inductor of clause 1, wherein the channel extends through a least a portion of the core, is open on two sides, and is electrically isolated from the core.

Clause 21: The inductor of clause 1, wherein the first and second plates further comprise at least one protrusion having an aperture configured to receive the fastener.

Clause 22: The inductor of clause 1, wherein the core is toroidal.

Clause 23: The inductor of clause 1, wherein the core is a racetrack shape.

Clause 24: The inductor of clause 1, wherein the core comprises strip wound into a core.

Clause 25: The inductor of clause 1, wherein the core comprises at least one of: a cobalt-based nanocrystalline alloy material, a nickel-based nanocrystalline alloy material, an iron-based nanocrystalline alloy material, or an amorphous magnetic material.

Clause 26: The inductor of clause 1, wherein the core is constructed to have a particular magnetic permeability value.

Clause 27: The inductor of clause 26, wherein the particular magnetic permeability value is based on a desired use of the inductor.

Clause 28: The inductor of clause 1, wherein the core has a variable permeability through its volume.

Clause 29: The inductor of clause 28, wherein the core has at least two regions having different permeability.

Clause 30: The inductor of clause 1, wherein a first region of the core has a relatively lower permeability than a second region of the core.

Clause 31: The inductor of clause 30, wherein the first region is a lower permeability region on an outer area of the core and the second region is a relatively higher permeability region on an inner area of the core.

Clause 32: The inductor of clause 30 or 31, wherein a permeability of the first region can be configured to provide short circuit current protection to the inductor.

Clause 33: An electrical device comprising the inductor of any one of clauses 1-31.

Clause 34: An electrical device comprising (a) an inductor, the inductor comprising (i) a magnetic core, (ii) a bobbin comprising a first plate and a second plate, and (iii) a coil wrapping around the core and the bobbin, (b) a housing, and (c) a fastener extending through the first plate, second plate, and at least one side of the housing, wherein the housing at least partially encloses the core, bobbin, and coil.

Clause 35: The electrical device of clause 34, wherein the core is fixed to the housing by the fastener.

Clause 36: The electrical device of clause 34 or 35, wherein the housing comprises an aperture defining an opening through the inductor.

Clause 37: The electrical device of any of clauses 34-36, wherein the fastener comprises a dielectric material.

Clause 38: The electrical device of any of clauses 34-37, wherein the housing comprises a plurality of panels.

Clause 39: The electrical device of clause 38, wherein the plurality of panels are held together by the fastener.

Clause 40: The electrical device of any of clauses 34-38, wherein the inductor is non-potted.

Clause 41: The electrical device of any of clauses 34-38, wherein the inductor is potted.

Clause 42: A method of constructing an electrical device comprising (a) providing a magnetic core, a bobbin, and a wire, (b) placing the magnetic core within the bobbin, (c) wrapping the wire in a coil around the bobbin and the magnetic core, (d) placing a housing around the wrapped core and bobbin, and (e) securing the housing with a fastener extending through the housing and the bobbin.

Clause 43: The method of clause 42, wherein providing a magnetic core comprises obtaining a nanocomposite magnetic material and tuning the permeability of the material to a particular level.

Clause 44: The method of clause 43, wherein the tuning comprises adjusting at least one of an annealing parameter or a material composition of the magnetic core.

Clause 45: The inductor of clause 1, wherein the core has a relative permeability of 5 to 5000.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A gapless medium voltage inductor comprising:

a magnetic core having an aperture extending therethrough;

a bobbin comprising a first plate and a second plate;

a spacer disposed within the aperture of the magnetic core;

a longitudinal channel defined through the spacer, first plate, and second plate; and a coil extending through the longitudinal channel and wrapping around the core and the bobbin;

wherein:

the core is disposed between the first and second plates;

the core comprises at least one of: a cobalt-based nanocrystalline alloy material, a nickel-based nanocrystalline alloy material, an iron-based nanocrystalline alloy material, or an amorphous magnetic material;

the spacer comprises a non-ceramic electrically-insulating material; and each of the first plate and the second plate further comprises at least one protrusion having an aperture configured to receive a fastener.

2. The inductor of claim 1, wherein:

the core comprises a stack of a plurality of discs each having a central aperture therethrough; and the central apertures together define the aperture through the core.

3. The inductor of claim 1, wherein:

the first and second plates each have an outer dimension larger than an outer dimension of the core.

4. The inductor of claim 3, wherein the first and second plates are configured to create a gap between the coil and an outer edge of the core.

5. The inductor of claim 1, wherein:

the inductor is configured to suppress common mode noise; and the core has a relative permeability of 100 to 5000.

6. The inductor of claim 1, wherein the first spacer electrically isolates the coil from the interior of the core and comprises at least one angled edge configured to influence a wrap angle of the coil.

7. The inductor of claim 1, wherein;

at least one of the first plate or second plate comprises at least one angled edge configured to influence a wrap angle of the coil; and the at least one angled edge is located along:

an interior surface that partially defines the longitudinal channel and an outer surface facing away from the core, or an outer surface parallel to the longitudinal channel and an outer surface facing away from the core.

8. The inductor of claim 1, wherein the spacer, first plate, second plate, and core are each symmetric about the longitudinal channel.

9. The inductor of claim 1, wherein the channel extends through at least a portion of the core, is open on two sides, and is electrically isolated from the core.

10. The inductor of claim 1, wherein:

the core has a variable permeability; and a first region of the core has a relatively lower permeability than a second region of the core.

11. The inductor of claim 10, wherein the first region is a lower permeability region on an outer area of the core and the second region is a relatively higher permeability region on an inner area of the core.

12. The inductor of claim 11, wherein a permeability of the first region is configured to provide short circuit current protection to the inductor.

13. The inductor of claim 1, wherein the core has a relative permeability of 25 to 500.

14. The inductor of claim 1, wherein:

the core comprises a stack of a plurality of discs each having a central aperture therethrough;

the central apertures together define the aperture through the core;

the core has a variable permeability; and a first region of the core has a lower relative permeability than a second region of the core.

15. The inductor of claim 1, wherein:

the core comprises one or more wound strips, each of the more or more strips comprising the same material; and a first region of the core has a lower relative permeability than a second region of the core.

16. The inductor of claim 15, wherein at least one of the one or more strips has a varying permeability along the length of the strip.

17. The inductor of claim 1, wherein:

the core has a variable permeability; and the permeability of the core varies such that the inductor exhibits soft saturation characteristics.

18. The inductor of claim 1, wherein:

the core has a variable permeability; and the permeability of the core varies such that the inductor exhibits hard saturation characteristics.

19. An electrical device comprising:

an inductor comprising:

a magnetic core;

a bobbin comprising a first plate and a second plate; and a coil wrapping around the core and the first and second plates of the bobbin;

a housing comprising a plurality of mating parts; and a fastener extending through the first plate, second plate, and at least one side of the housing;

wherein the housing at least partially encloses the core, bobbin, and coil.

20. The electrical device of claim 19, wherein the core comprises at least one of: a cobalt-based nanocrystalline alloy material, a nickel-based nanocrystalline alloy material, an iron-based nanocrystalline alloy material, or an amorphous magnetic material.

21. The electrical device of claim 19, wherein a first region of the core has a relatively lower permeability than a second region of the core.

22. The electrical device of claim 19, wherein the core comprises a wound strip.

23. The electrical device of claim 22, further comprising at least one spacer, wherein:

the core is wound around the at least one spacer; and the coil extends through the at least one spacer.

24. The electrical device of claim 19, wherein the core comprises a plurality of stacked core discs.

25. The electrical device of claim 19, wherein the inductor is suspended within the housing at least in part by the fastener.

* * * * *